United States Patent
Lee et al.

(10) Patent No.: US 11,641,384 B1
(45) Date of Patent: May 2, 2023

(54) SYSTEM FOR LINKING CHATBOT SERVICES AND CONTACT CENTER SERVICES

(71) Applicant: MindwareWorks Co., Ltd., Seoul (KR)

(72) Inventors: Jae In Lee, Goyang-si (KR); Hyun Sun Cho, Seoul (KR); Seong Kuk Mun, Namyangju-si (KR); Kyung Taek Park, Seoul (KR)

(73) Assignee: MindwareWorks Co., Ltd., Seoul (KR)

( * ) Notice: Subject to any disclaimer, the term of this patent is extended or adjusted under 35 U.S.C. 154(b) by 0 days.

(21) Appl. No.: 17/892,123

(22) Filed: Aug. 22, 2022

(30) Foreign Application Priority Data

May 16, 2022 (KR) .................. 10-2022-0059297

(51) Int. Cl.
*H04L 65/1104* (2022.01)
*H04L 51/02* (2022.01)
*H04L 65/1096* (2022.01)

(52) U.S. Cl.
CPC .......... *H04L 65/1096* (2013.01); *H04L 51/02* (2013.01); *H04L 65/1104* (2022.05)

(58) Field of Classification Search
None
See application file for complete search history.

(56) References Cited

U.S. PATENT DOCUMENTS

| | | | | |
|---|---|---|---|---|
| 7,921,214 | B2* | 4/2011 | Da Palma | G10L 15/22 |
| | | | | 709/227 |
| 10,617,959 | B2* | 4/2020 | Liu | G06N 20/00 |
| 10,645,225 | B1* | 5/2020 | Stoops | H04M 7/0045 |
| 10,817,265 | B2* | 10/2020 | Collins | H04L 51/02 |
| 10,848,443 | B2* | 11/2020 | Helmy | G06N 5/041 |
| 10,924,442 | B2* | 2/2021 | Price | H04L 51/02 |
| 10,951,554 | B1* | 3/2021 | Highman | G06Q 30/0641 |
| 10,951,768 | B2* | 3/2021 | Pace | H04M 3/527 |
| 10,972,410 | B2* | 4/2021 | Myung | G06F 16/316 |
| 10,992,604 | B1* | 4/2021 | Knas | H04L 51/04 |
| 11,012,379 | B2* | 5/2021 | Maruyama | H04L 12/1813 |
| 11,012,384 | B2* | 5/2021 | Parekh | H04L 51/212 |
| 11,012,568 | B2* | 5/2021 | Shinseki | G06Q 10/10 |
| 11,057,522 | B2* | 7/2021 | Lee | H04M 3/4933 |

(Continued)

FOREIGN PATENT DOCUMENTS

| | | |
|---|---|---|
| KR | 10-1827320 B1 | 2/2018 |
| KR | 10-2146031 B1 | 8/2020 |

*Primary Examiner* — Backhean Tiv
(74) *Attorney, Agent, or Firm* — Revolution IP, PLLC (57) ABSTRACT

Disclosed is a system for linking chatbot services and contact center services, and more particularly to a system for linking chatbot services and contact center services, in which a client is allowed to receive a query processing service from at least one of other chatbot servers or other contact center servers without changing a preexisting connection state while being initially connected to a specific chatbot server or a specific contact center server, so that a user can easily use a plurality of query processing services by linking the chatbot servers and contact center servers operated by a plurality of service providers, thereby minimizing the time, efforts and costs of the user who wants to receive the plurality of query processing services through the plurality of service providers.

7 Claims, 2 Drawing Sheets

(56) References Cited

U.S. PATENT DOCUMENTS

| | | | | |
|---|---|---|---|---|
| 11,089,159 B2* | 8/2021 | Conroy | ............... | H04M 3/5191 |
| 11,190,469 B2* | 11/2021 | Erhart | .................... | G06F 40/30 |
| 11,223,580 B1* | 1/2022 | Parr | ........................ | G06F 40/35 |
| 11,301,908 B2* | 4/2022 | Batcha | ................ | H04L 12/1822 |
| 11,343,290 B2* | 5/2022 | Palandurkar | ........ | H04L 65/1063 |
| 11,366,573 B2* | 6/2022 | Roisman | ................ | G06Q 10/02 |
| 11,379,253 B2* | 7/2022 | Pichiliani | ................ | H04L 51/56 |
| 11,381,682 B2* | 7/2022 | Matula | .................. | H04L 67/535 |
| 11,394,667 B2* | 7/2022 | Bobbarjung | ............ | H04L 51/02 |
| 11,412,086 B2* | 8/2022 | Lee | ..................... | H04M 7/0042 |
| 11,425,251 B2* | 8/2022 | Konig | .................... | G06Q 30/01 |
| 11,444,893 B1* | 9/2022 | Kalluri | .................... | H04L 51/02 |
| 11,487,898 B2* | 11/2022 | Lee | ..................... | G06F 16/9535 |
| 11,489,887 B1* | 11/2022 | Lee | ..................... | H04L 65/1104 |
| 11,556,295 B2* | 1/2023 | Ohashi | .................. | G06F 3/1268 |
| 2017/0289071 A1* | 10/2017 | Roberts | ................... | H04L 67/01 |
| 2019/0199658 A1* | 6/2019 | Kim | ...................... | H04L 51/214 |
| 2023/0080724 A1* | 3/2023 | Stoops | ................. | H04M 3/5183 |

* cited by examiner

SYSTEM FOR LINKING CHATBOT SERVICES AND CONTACT CENTER SERVICES

CROSS-REFERENCE TO RELATED APPLICATION

This application claims priority from Korean Patent Application No. 10-2022-0059297, filed on May 16, 2022 in the Korean Intellectual Property Office, the disclosure of which is incorporated herein by reference.

BACKGROUND OF THE INVENTION

(a) Field of the Invention

The disclosure relates to a system for linking chatbot services and contact center services, and more particularly to a system for linking chatbot services and contact center services, which allows a client to receive a query processing service from at least one of other chatbot servers or other contact center servers without changing a preexisting connection state while being initially connected to a specific chatbot server or a specific contact center server, so that a user can easily use a plurality of query processing services by linking the chatbot servers and contact center servers operated by a plurality of service providers, thereby minimizing the time, efforts and costs of the user who wants to receive the plurality of query processing services through the plurality of service providers.

(b) Description of the Related Art

With the recent expansion of messenger use environments through smartphones and the recent development of artificial intelligence, customers and companies have wanted to contact each other through messaging services, and therefore a chatbot system that helps the customers and the companies to find solutions with interactive services based on natural language processing has been in the limelight. Such a chatbot system refers a system that originally means a chatter robot system, and may also be called a talking robot.

Chatbots are being used in various fields such as electronic commerce, banking, etc. to support customer, acquire information, and so on. For example, Bank of America, Starbucks, Disney, and the like companies are employing the chatbots in taking orders and serving customers.

For smooth conversations with the chatbot, there are required pattern recognition technology that enables a machine to recognize a voice, a text, etc. based on artificial intelligence (AI) and big data analytics; natural language processing technology that makes human languages be learned by a computer and utilized in question and answer, translation, etc.; semantic web technology that enables a computer to understand information and make logical inference from the information; text mining technology that mines useful information from data consisting of texts; context-aware computing technology that anticipates the situation and context of a conversation partner; and so forth.

Such a chatbot system refers to a system implemented to respond to a user through a messenger based on given response rules. The chatbot system is utilized in home shopping, Internet shopping malls, insurance companies, banks, food delivery, accommodation reservations, etc. to answer customer questions or recommend suitable products or services based on the preexisting consumer propensities.

A user may want to receive query processing services by accessing chatbot servers respectively operated by a plurality of service providers. For example, a user may have to ask a chatbot server of Lotte Card Co., Ltd. in succession while receiving a query processing service by accessing a chatbot server of Hyundai Card Co., Ltd., or a user may suddenly wonder about a delivery status of a purchase and ask a chatbot server of a corresponding shopping mall while receiving a query processing service by accessing a chatbot server of a specific bank.

In this case, in a current chatbot service, a user receives the query processing service by accessing the chatbot server of Hyundai Card Co., Ltd. through a dedicated app or browser or the like accessing means of Hyundai Card Co., Ltd., and then terminates the corresponding access. Next, the user has to receive the query processing service again by accessing the chatbot server of Lotte Card Co., Ltd. through the dedicated app or browser or the like accessing means of Lotte Card Co., Ltd.

Consequently, when a user wants to use the chatbot servers respectively operated by the plurality of service providers, there is a disadvantage in that the user has to receive the query processing services by individually accessing the chatbot servers through the individual accessing means.

In relation to technology of using the plurality of chatbot servers, Korean Pat. No. 10-2146031 (hereinafter, referred to as the "related art 1") has proposed a chatbot system based on a multi-domain and a method for providing a chatbot service.

However, the related art 1 merely discloses a chatbot system that, when query processing is not possible with regard to a user's specific query input to a chatbot server, the specific query is transmitted to and processed by an external chatbot server, but does not disclose that a plurality of queries a user wants to ask the plurality of service providers are transmitted to the chatbot servers and the plurality of queries related to the services are more efficiently processed.

Meanwhile, a contact center has conventionally been called a 'call center' as a system that employs only a voice call to respond to a user. In relatively recent combination with various functions such as text counseling, chatting counseling, push notification, etc., the call center is collectively called the 'contact center' as it is utilized in home shopping, Internet shopping malls, insurance companies, banks, food delivery, accommodation reservations, etc. to answer customer questions or to recommend suitable products or services based on the preexisting consumer propensities.

In additional combination with various artificial intelligence technologies, technologies, which are called an 'artificial intelligence contact center,' have been on the rise.

The artificial intelligence contact center is also called an AI contact center where AI combines with the call center and a customer counselling center. Based on voice recognition, speech synthesis, text parsing, conversation engine, and the like technologies, telephone consultation services for business customers are optimized. The AI allows a customer to easily register his/her requirements, and provides answers on behalf of a representative when a solution is relatively simple, thereby increasing productivity of consultation work.

A user may want to receive query processing services by connecting to contact center servers respectively operated by a plurality of service providers. For example, a user may have to ask a contact center server of Lotte Card Co., Ltd. in succession while receiving a query processing service by connecting to a contact center server of Hyundai Card Co., Ltd., or a user may suddenly wonder about a delivery status of a purchase and ask a contact center server of a corresponding shopping mall while receiving a query processing service by connecting to a contact center server of a specific bank.

In this case, in a current contact center service, a user receives the query processing service by connecting to the contact center server of Hyundai Card Co., Ltd. through a voice-calling terminal, connection software, a browser or the like connection means, and then terminates the corresponding connection. Next, the user has to receive the query processing service again by connecting to the contact center server of Lotte Card Co., Ltd. through the voice-calling terminal, connection software, the browser or the like connection means.

Consequently, when a user wants to use the contact center servers respectively operated by the plurality of service providers, there is a disadvantage in that the user has to individually connect to each contact center server every time to receive the query processing service.

In relation to the technology of using the AI contact center server, Korean Pat. No. 10-1827320 (hereinafter, referred to as the "related art 2") has proposed an AI contact center server capable of operating an unmanned contact center by AI.

However, the related art 2 merely discloses a general AI contact center server configured to perform an AI process to get a correct answer to a question asked by a customer, but does not disclose that a plurality of queries a user wants to ask the plurality of service providers respectively are transmitted to the contact center servers and the contact center servers are linked to one another to more efficiently process the plurality of queries related to the services.

Meanwhile, a method of more efficiently processing a plurality of queries related to services by linking chatbot servers and contact center servers together has not been proposed so far.

SUMMARY OF THE INVENTION

Accordingly, the disclosure is conceived to solve the foregoing conventional problems, and an aspect of the disclosure is to provide a system for linking chatbot services and contact center services, which allows a client to receive a query processing service from at least one of other chatbot servers or other contact center servers without changing a preexisting connection state while being initially connected to a specific chatbot server or a specific contact center server, so that a user can easily use a plurality of query processing services by linking the chatbot servers and contact center servers operated by a plurality of service providers, thereby minimizing the time, efforts and costs of the user who wants to receive the plurality of query processing services through the plurality of service providers.

According to the disclosure as proposed to solve the foregoing problems, a system for linking chatbot services and contact center services, the system includes: a plurality of chatbot servers operated by a plurality of service providers, and configured to provide a query processing service that generates a response to a query received from a client and transmits the response to the client; a plurality of contact center servers operated by a plurality of service providers, and configured to provide a query processing service that generates a response to a query received from a client and transmits the response to the client; a client configured to receive a query processing service from at least one different chatbot server or at least one contact center server while being initially connected to one specific chatbot server among the plurality of chatbot servers, or receive a query processing service from a different contract center server or a specific chatbot server by call forwarding of the specific contact center server when a request for accessing the different contact center server or the specific chatbot server is made while being initially connected to one specific contact center server among the plurality of contact center servers; and an the integrated operation server configured to process a query processing service to be relayed between the client and at least one contact center server when the client wants to receive the query processing service from the at least one contact center server while being initially connected to one specific chatbot server among the plurality of chatbot servers, and process a query processing service to be relayed between the client and the specific chatbot server when the client requests an access to the specific chatbot server while being connected to the specific contact center server.

Here, the specific chatbot server to which the client is initially connected may be configured to transmit information about the service providers cooperating in a link service and link information for linking the chatbot servers and contact center servers operated by the service providers to the client.

Here, when a user makes inputs on a link intention mark and one of the service providers operating the chatbot server and then makes an input for a link query, the client may transmit the link query to the chatbot server operated by the service provider corresponding to the input and receive the query processing service, and when the user makes inputs on the link intention mark and one of the service providers operating the contact center server and then makes an input for a link query, the client may transmit the link query to the integrated operation server and receive the query processing service from the contact center server operated by the service provider corresponding to the input through relaying of the integrated operation server.

Here, the integrated operation server that has received a link query may be configured to make a phone call to the contact center server, convert the link query into a voice, transmit the voice the contact center server, receive a response from the contact center server, convert the response into a text, and transmit the text to the client.

Further, the specific contact center server to which the client is initially connected may be configured to store and manage information about the service providers cooperating in a link service and link information for linking the contact center servers and chatbot servers operated by the service providers.

Here, when receiving a link intention mark and information about one of the service providers operating the contact center server from the client, the specific contact center server may perform call forwarding while transmitting session initiation protocol (SIP) information about the client to the contact center server operated by the service provider, the information of which has been received, so that the client can receive the query processing service from the contact center server operated by the corresponding service provider, and when receiving the link intention mark and information about one of the service providers operating the chatbot server from the client, the specific contact center server may perform call forwarding while transmitting SIP information about the client to the integrated operation server, so that the client can receive the query processing service from the chatbot server operated by the server provider, the information of which has been received, through relaying of the integrated operation server.

Here, the integrated operation server that performs the relaying may be configured to access the chatbot server, receive a link query from the client, convert the link query into a text, transmit the text to the chatbot server, receive a response from the chatbot server, convert the response into a voice, and transmit the voice to the client.

BRIEF DESCRIPTION OF THE DRAWINGS

The above and/or other aspects of the disclosure will become apparent and more readily appreciated from the following description of the exemplary embodiments, taken in conjunction with the accompanying drawings, in which.

DETAILED DESCRIPTION

Below, embodiments of a system for linking chatbot services and contact center services according to the disclosure with the foregoing objects, solutions, and effects will be described in detail with reference to the accompanying drawings.

Figure 1:
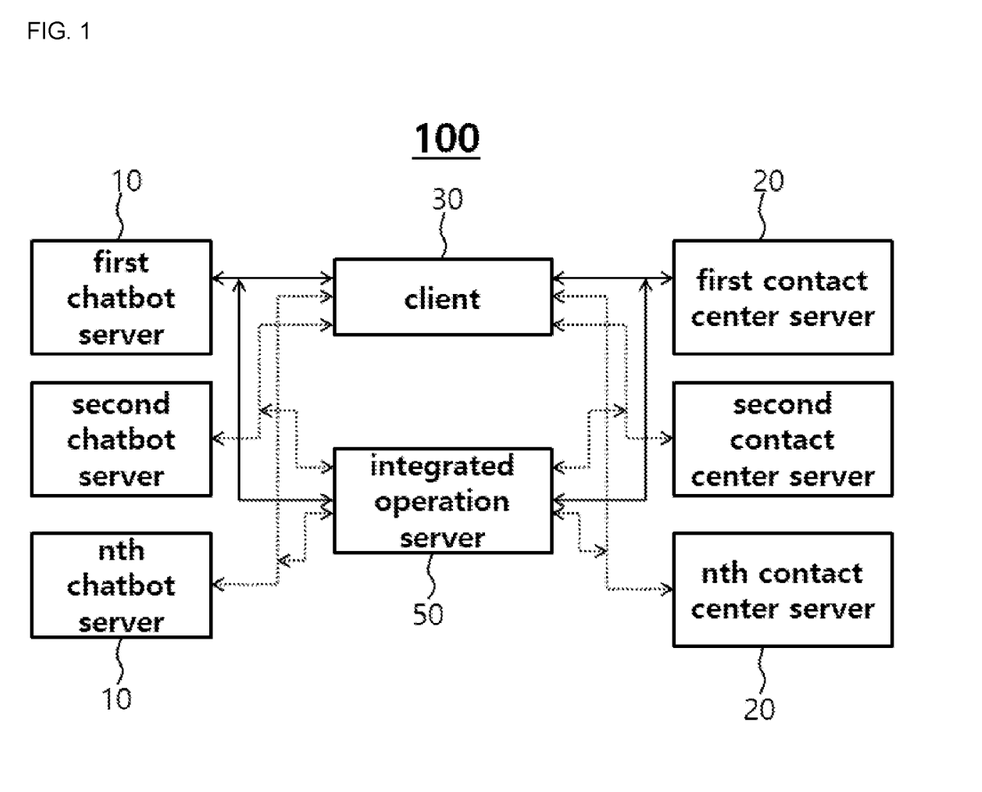
FIG. 1 is a block diagram of a system for linking chatbot services and contact center services according to an embodiment of the disclosure.
Figure 2:
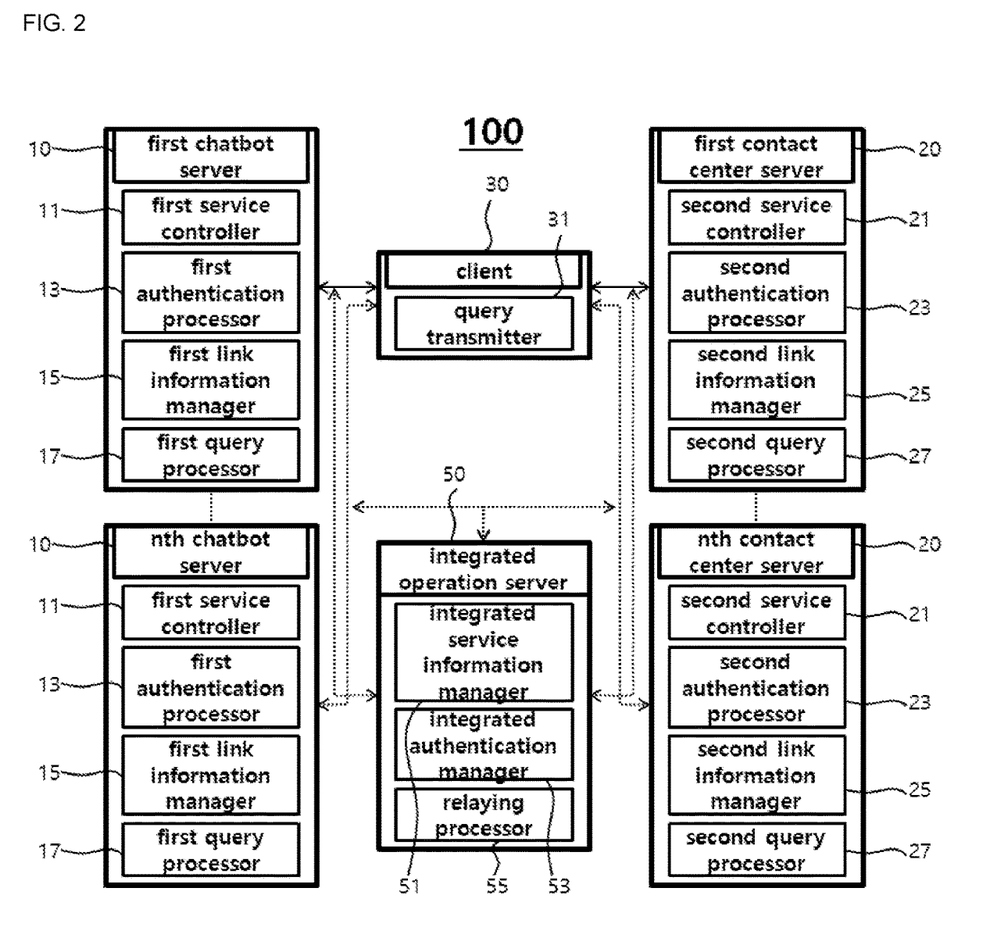
FIG. 2 is a detailed block diagram of a system for linking chatbot services and a contact center services according to an embodiment of the disclosure.

As shown in FIGS. 1 and 2, a system 100 for linking chatbot services and contact center services according to an embodiment of the disclosure includes a plurality of chatbot servers 10 including a first chatbot server, a second chatbot server, . . . , an nth chatbot server; a plurality of contact center servers 20 including a first contact center server, a second contact center server, . . . , an nth contact center server; a client 30 allowed to receive a query processing service from at least one different chatbot server 10 or at least one contact center server 20 while being initially connected to one specific chatbot server 10 among the plurality of chatbot servers 10, or allowed to receive a query processing service from a different contact center server 20 or a specific chatbot server 20 by the call forwarding of the specific contact center server 20 when a request for accessing the different contact center server 20 or the specific chatbot server 20 is made while being initially connected to one specific contact center server 20 among the plurality of contact center servers 20; and an the integrated operation server 50 configured to process a query processing service to be relayed between the client 30 and at least one contact center server 20 when the client 30 wants to receive the query processing service from the at least one contact center server 20 while being initially connected to one specific chatbot server 10 among the plurality of chatbot servers 10, and process a query processing service to be relayed between the client 30 and the specific chatbot server 10 when the client 30 requests an access to the specific chatbot server 10 while being connected to the specific contact center server 20.

Below, it will be first described that the client 30 receives a query processing service from at least one different chatbot server 10 or at least one contact center server 20 while being initially connected to one specific chatbot server 10 among the plurality of chatbot servers 10, and it will be then described that the client 30 receives the query processing service from a different contact center server 20 or a selected specific chatbot server 10 by the call forwarding of a specific contact center server 20 when the client 30 requests an access to the different contact center server 20 or the selected specific chatbot server 10 while being initially connected to one specific contact center server 20 among the plurality of contact center servers 20.

The plurality of chatbot servers 10 and the plurality of contact center servers 20 according to the disclosure are operated by a plurality of service providers, and carry out a service that generates a response to a query received from the client 30 and transmits the response to the client 30, in other words, a query processing service. Each chatbot server 10 is operated by each corresponding service provider to provide a query processing service related to a variety of business to users.

Each chatbot server 10 basically performs the query processing service corresponding to the service for generating a response to a query received from the client 30 and transmitting the generated response to the client 30, and further allows the client 30, which has received the query processing service by being initially connected to the corresponding chatbot server 10, to directly access a different chatbot server 10 or indirectly access a contact center server 20 through relaying of the integrated operation server 50 and receive a link service while maintaining the current connection state.

For example, the client 30 may receive a query processing service by accessing the first chatbot server 10 through a specific accessing means (e.g., an connect dedicated app, a browser, etc. autonomously developed by financial institutions, commerce companies, and the like companies that provide customer services and including chatbot services), and may further receive a link service by directly accessing at least one of different chatbot servers 10 (e.g., the second to nth chatbot servers) with the help of the first chatbot server 10 or indirectly access at least one of contact center servers 20 (e.g., the first to nth contact center servers) while maintaining the connection state using the current accessing means.

In other words, the client 30 does not terminate the specific accessing means for accessing the first chatbot server 10 to receive the link service by connecting a different chatbot server 10 or a specific contact center server 20 through another separate accessing means, but maintains the current connection state using the specific accessing means to receive the link service by directly accessing the different chatbot server 10 or indirectly accessing the specific contact center server 20 through the relaying of the integrated operation server 50.

To make the link service possible, the specific chatbot server 10, to which the client 30 is initially connected, performs an operation of sending the client 30 information about service providers cooperating in the link service and link information about the chatbot servers 10 and contact center servers 20 operated by the service providers cooperating in the link service to the client 30.

Specifically, when the client 30 is connected to a specific chatbot server 10, e.g., the first chatbot server 10 through the specific accessing means, the specific chatbot server 10 sends the client 30 the information (e.g., the name, etc.) about the service providers cooperating in the link service, the link information (e.g., the uniform resource locator (URL) address information about the chatbot servers) for accessing the chatbot servers 10 operated by these service providers, and the link information (e.g., the telephone number information about the contact center servers or the URL address information about the integrated operation server 50) for accessing the contact center servers 20).

To this end, the chatbot servers 10 manage the link information (e.g., the URL address information about the chatbot servers) for linking the service providers cooperating in the link service and the chatbot servers 10 operated by these service providers or the link information (e.g., the telephone number information about the contact center servers or the URL address information about the integrated operation server 50) for linking the service providers and the contact center servers 20 operated by these service providers to be stored in a first link information manager 15 as matched to each other. The link information for linking the service providers and the chatbot servers 10 and contact center servers 20 operated by these service providers may be stored and managed in each chatbot server 10 by various methods. For example, the link information may be stored and managed as being received from the integrated operation server 50 or as being updated periodically or when it is renewed (e.g., when there is a change in companies cooperating in the link service, etc.).

As described above, the client 30 may receive the query processing service from at least one of different chatbot servers (e.g., the second to nth chatbot servers) or at least one contact center server 20 while being initially connected to one specific chatbot server (e.g., the first chatbot server) among the plurality of chatbot servers 10. In other words, the client 30 may receive the link service by directly accessing a selected different chatbot server 10 or indirectly accessing a selected specific contact center server 20 through the relaying of the integrated operation server 50 while maintaining the connection state using the current accessing means.

Here, the client 30 may correspond to one of various terminals or media as long as it can transmit a query and receive a response by accessing the chatbot server 10. For example, the client 30 may include a computer, a mobile phone, a smartphone, or the like connectable to a network.

The client 30 uses a specific accessing means to initially access a specific chatbot server 10, for example, a dedicated app or a universal browser for accessing the specific chatbot server 10. The client 30 receives the query processing service from the specific chatbot server 10 while being connected to the specific chatbot server 10 through the specific accessing means.

While being connected to the specific chatbot server 10, e.g., the first chatbot server, the client 30 may need to receive the link service by accessing a different chatbot server 10, e.g., the second chatbot server. For example, the client 30 may situationally need to receive the query processing service from Lotte Card Co., Ltd. operating a chatbot server while receiving the query processing service by initially accessing the chatbot server 10 operated by Hyundai Card Co., Ltd. through the dedicated app provided by Hyundai Card Co., Ltd.

In this case, the client 30 may receive the link service by accessing the different chatbot server 10 (e.g., the chatbot server operated by Lotte Card Co., Ltd.) while maintaining the current connection state without terminating the current accessing means (e.g., the dedicated app provided by Hyundai Card Co., Ltd).

While being connected to the specific chatbot server 10, e.g., the first chatbot server, the client 30 may need to receive the link service by accessing one contact center server, e.g., the first contact center server 1 among the plurality of contact center servers 20. For example, the client 30 may situationally need to receive the query processing service from Nonghyup Bank operating a contact center server while receiving the query processing service by initially accessing the chatbot server 10 operated by Hyundai Card Co., Ltd. through the dedicated app provided by Hyundai Card Co., Ltd.

In this case, the client 30 may receive the link service by indirectly accessing a specific contact center server 20 (e.g., the contact center server operated by Nonghyup Bank.) through relaying of the integrated operation server 50 while maintaining the current connection state without terminating the current accessing means (e.g., the dedicated app provided by Hyundai Card Co., Ltd).

Specifically, when an input for a link query is made by a user after making inputs on a link intention mark and one of the service providers operating the chatbot server 10, a query transmitter 31 of the client 30 transmits the link query to the chatbot server 10 operated by the service provider corresponding to the input and receives the query processing service.

Meanwhile, when an input for a link query is made by a user after making inputs on a link intention mark and one of the service providers operating the contact center server 20, the query transmitter 31 of the client 30 transmits the link query to the integrated operation server 50 and receives the query processing service from the contact center server 20, operated by the service provider corresponding to the input, through the relaying of the integrated operation server 50.

Here, the link query refers to a query that the client 30 wants to transmit to a different chatbot server 10 or a specific contact center server 20 selected by a user while being connected to the specific chatbot server 10.

When the client 30 is connected to the specific chatbot server 10 through the specific accessing means, the client 30 receives information about the service providers cooperating in the link service and the link information for linking the chatbot servers 10 and contact center servers 20 operated by the service providers from the specific chatbot server 10 as described above. Therefore, a user can transmit the link query to a desired different chatbot server or a desired contact center server 20 based on the information received from the specific chatbot server 10.

Specifically, the client 30 needs to recognize that a user intends to make the link query to a different chatbot server 10 or different contact center server 20 operated by a different service provider while maintaining the connection with the specific chatbot server 10. To this end, when a user wants to make a link query to a different chatbot server 10 or a specific contact center server 20, the user may first make an input for the link intention mark. A user makes an input for the link intention mark, selects or makes an input for a service provider (i.e., the service provider that operates the chatbot server or the contact center server) to which the link query will be made, and then inputs the link query to be transmitted.

In more detail, a user inputs the link intention mark, e.g., "@", selects or inputs one of the service providers cooperating in the link service, and then an inputs the link query. A user may input the link intention mark, i.e., "@" and then input one of the service providers cooperating in the link service in person. However, when a user inputs the link intention mark, i.e., "@", the client 30 may automatically list the service providers cooperating in the link service so that the user can select and input one of the listed service providers cooperating in the link service. As described above, the link information for linking the service providers cooperating in the link service and the chatbot servers and contact center servers being operated by these service providers may be stored and managed as received from the specific chatbot server when the client 30 is connected to the specific chatbot server 10.

When a user makes inputs on the link intention mark and one of the service providers operating the chatbot server 10 and then makes an input for the link query, the client 30 may transmit the link query to the link information (e.g., the URL address information of the chatbot server) for accessing the chatbot server 10 operated by the service provider corresponding to the input, thereby receiving the query processing service.

Further, when a user makes inputs on the link intention mark and one of the service providers operating the contact center server 20 and then makes an input for the link query, the client 30 may transmit the link query to the integrated operation server 50, thereby receiving the query processing service from the contact center server 20 operated by the service provider corresponding to the input through the relaying of the integrated operation server 50.

In this case, the client 30 transmits the link query to the integrated operation server 50, with reference to the information received from the initially connected specific chatbot server 10, i.e., the link information for linking the contact center servers. The link information for linking the contact center servers 20 refers to the information received from the initially connected specific chatbot server, and may include the chatbot URL information of the integrated operation server 50 or the phone number information of the contact center server 20.

When the link information is identified as the URL information, the client 30 transmits the link query to the corresponding URL information. The URL information corresponding to the link information includes the chatbot URL information of the integrated operation server 50. On the other hand, when the link information is identified as the phone number information, the client 30 transmits the link query to the preset chatbot URL information of the integrated operation server 50.

When receiving the link query from the client 30, the integrated operation server 50 relays the query processing service between the client 30 and the contact center server 20 selected based on the input of the client 30.

Specifically, the integrated operation server 50 that has received the link query performs operations of making a phone call to the contact center server 20, converting the link query into a voice, transmitting the voice to the contact center server 20, receiving a response from the contact center server 20, converting the response into a text, and transmitting the text to the client 30. Such operations are carried out by the relaying processor 55.

When receiving the link query from the client 30, the integrated operation server 50 also receives the phone number information of the contact center server 20 selected based on the input of the client. Therefore, the integrated operation server 50 can transmit the link query after making a phone call to the contact center server 20.

Here, the link query received from the client 30 is given as text information, and the information to be transmittable to the contact center server 20 is given as voice information. Therefore, the integrated operation server 50 employs the relaying processor 55 to convert the link query received from the client 30 in the form of a text into a voice and then transmit the voice to the contact center server 20.

The contact center server 20 generates a response to the received voice converted from the link query, and transmits the response to the integrated operation server 50. In this case, the response received in the integrated operation server 50 is given as voice information, and the response to be transmittable to the client 30 is given as text information. Therefore, the integrated operation server 50 employs the relaying processor 55 to convert the response received from the contact center server 20 in the form of a voice into a text, and then transmit the text to the client 30.

As described above, the client 30 may directly transmit the link query to the different chatbot server 10 while maintaining the current connection state, or indirectly transmit the link query to a desired contact center server 20 through relaying of the integrated operation server 50, thereby receiving a link service.

The different chatbot server 10 or the contact center server 20, which has received the link query, performs an authentication process (hereinafter, referred to as a "proxy authentication process") for the client 30 before responding to the link query. The different chatbot server 10 or the contact center server 20, which has received the link query, may directly perform this authentication process, or the integrated operation server 50 may perform this proxy authentication process on behalf of the different chatbot server 10 or the contact center server 20.

The integrated operation server 50 stores and manages information about a plurality of service providers and a plurality of chatbot servers 10 and contact center servers 20 operated by them, and performs an operation of carrying out an proxy authentication process, which is performed to access at least one other chatbot server 10 or a contact center server 20, by proxy in the state that the client 30 is being connected to one of the chatbot servers 10.

The integrated operation server 50 stores and manages the information about the service providers that want to provide the link service to the client 30. In other words, the service provider previously registers cooperation in the link service to the integrated operation server 50 while registering its own basic information and link information (e.g., URL address information) of a chatbot server and/or link information (e.g., phone number information) of a contact center server it operates in order to provide the link service to the client 30.

The integrated operation server 50 carries out an operation of the proxy authentication process, which is performed to access at least one other chatbot server 10 or contact center server 20, by proxy while the client 30 is being connected to one of the chatbot servers 10. In other words, when the client 30 being connected to the specific chatbot server 10 accesses another chatbot server or contact center server 20 and transmits a link query, the integrated operation server 50 carries out the proxy authentication process for the client 30 on behalf of the chatbot server 10 or the contact center server 20 that received the link query.

Like this, the integrated operation server 50 is configured to perform user authentication in an integrated way on behalf of service providers and the chatbot server 10 or contact center server 20 being operated by the service providers, so that a user can ultimately avoid repetitive authentication processes and the service providers providing the authentication processes can also reduce time, efforts and costs incurred by repeating the authentication processes for the user who has already been validly authenticated just before access.

The chatbot server 10 or the contact center server 20 that received the link query may directly perform the proxy authentication process. However, the chatbot server 10 or the contact center server 20 that received the link query is being operated by the service providers registered to the integrated operation server 50 and cooperating in the link service, and therefore the integrated operation server 50 carries out the proxy authentication process for the client 30 on behalf of the chatbot server 10 or the contact center server 20 that received the link query.

Specifically, the chatbot server 10 or the contact center server 20 that received the link query requests the integrated operation server 50 to identify whether authentication of a user is valid. When the authentication of the user is valid, the integrated operation server 50 transmits an authentication validation message and current valid user information to the chatbot server 10 or the contact center server 20 that received the link query. When the authentication of the user is not valid, the integrated operation server 50 performs an proxy authentication process through a preset authentication means and then transmits an authentication completion message and new user information obtained in the proxy authentication process to the chatbot server 10 or the contact center server 20 that received the link query.

The chatbot server 10 or the contact center server 20 that received the link query does not provide a query processing service by generating a response to the link query, but requests the integrated operation server 50 to identify whether authentication of a user is valid. When the client 30 transmits a link query to the chatbot server 10 or the contact center server 20, the chatbot server 10 or the contact center server 20 receives the link query together with contact information (typically, a user' name, phone number, birth date, and the like information needed to check identification and a real name) of the client 30, and therefore requests the integrated operation server 50 to identify whether the authentication of the user is valid (whether the user is authenticated and whether the authentication is valid) based on the contact information of the client 30.

Then, the integrated operation server 50 identifies whether the authentication of the user is valid (whether the user is authenticated and whether the authentication is valid) with respect to the user of the client 30. Identifying whether a user's authentication is valid is to identify not only whether the user is identical to a user whose authentication has been valid but also whether authentication validity has expired even though the preexisting authentication has been valid. For example, the integrated operation server 50 identifies that authentication of a user is valid when the user has previously been validly authenticated and its authentication validity has not expired. On the other hand, the integrated operation server 50 identifies that authentication of a user is not valid when the user is first connected to the chatbot server 10 or the contact center server 20 that received the link query and thus the authentication has not been valid before or when the authentication validity has expired even though the authentication has been valid.

When it is identified that the authentication of the user is valid, the integrated operation server 50 transmits the authentication validation message and the current valid user information to the chatbot server 10 or the contact center server 20 that received the link query. Because the integrated operation server 50 is storing and managing information about a user whose authentication is valid, i.e., information needed for the authentication of the user (e.g., a phone number, a name, a birth date, etc.), the valid user information being currently stored and managed is transmitted to the chatbot server 10 or the contact center server 20 that received the link query when it is identified that the authentication of the user is valid. Then, the chatbot server 10 or the contact center server 20 that received the link query generates a response to the link query and provides a query processing service by using the user information as basic information.

On the other hand, when it is identified that the authentication of the user is invalid, the integrated operation server 50 performs a user authentication process using the present authentication means, and then transmits an authentication completion message and new user information obtained in the proxy authentication process to the chatbot server 10 or the contact center server 20 that received the link query. The integrated operation server 50 makes the user authentication process be carried out through the authentication means, which is previously set based on the selection of the service provider operating the chatbot server 10 or the contact center server 20 that received the link query, among various authentication means such as Kakao Pay, PASS, Shinhan authentication, KB authentication, public authentication, integrated authentication, etc.

Because the user uses information such as a phone number, a name, birth date, and the like needed for checking a real name and identification to pass the authentication process, the integrated operation server 50 can newly obtain the user's information when the user authentication is completed. Therefore, the integrated operation server 50 identifies that the authentication of the user who newly passed the authentication process is valid, and stores and manages the information about the user whose authentication is valid. Further, when the authentication is completed, the integrated operation server 50 transmits an authentication completion message and new user information obtained during the proxy authentication process to the chatbot server 10 or the contact center server 20 that received the link query. Then, the chatbot server 10 or the contact center server 20 that received the link query generates a response to the link query by using the user information as the basic information and provide the query processing service.

It has so far been described that the client 30 receives the query processing service from at least one different chatbot server 10 or at least one contact center server 20 while being initially connected to one specific chatbot server 10 among the plurality of chatbot servers 10. Below, it will be described that the client 30 makes a request for accessing a different contact center server 20 or a selected specific chatbot server 10 while being initially connected to one specific contact center server 20 among the plurality of contact center servers 20, and receives the query processing service from the different contact center server 20 or the specific chatbot server 10 by the call forwarding of the specific contact center server 20.

The plurality of contact center servers 20 are operated by the plurality of service providers, and perform operations of generating a response to a query received from the client 30 and transmitting the response to the client 30, i.e., providing the query processing service. The contact center server 20 is operated by each corresponding service provider to give users the query processing services related to various tasks.

The contact center server 20 basically performs the query processing service corresponding to the service for generating a response to a query received from the client 30 and transmitting the generated response to the client 30.

Further, when the client 30, which has received the query processing service by being initially connected to the contact center server 20, requests connection with a different contact center server 20 or a specific chatbot server 10 while maintaining the current connection state, the contact center server 20 performs the call forwarding to directly connect the client 30 to the different contact center server 20 or indirectly connects the client 30 to the chatbot server 10 through relaying of the integrated operation server 50, thereby allowing the chatbot server 10 to receive the link service.

For example, the client 30 may receive the query processing service by connecting with a first contact center server 20 through a specific accessing means (e.g., a terminal, software, a browser, or the like that can make a voice call), and further receive the link service by directly connecting with another contact center server (e.g., one of second to nth contact center servers) through the call forwarding of the first contact center server 20 while maintaining the current connection state without terminating the current connection state, or by indirectly connecting with a desired chatbot server 10 through relaying of the integrated operation server 50. In other words, the client 30 does not terminate the connection with the first contact center server 20 to receive the link service by newly connecting with the different contact center server 20 or the chatbot server 10 through the accessing means, but maintain the connection with the first contact center server 20 to receive the link service by directly connecting with the different contact center server 20 or indirectly connecting with the chatbot server 10.

To this end, the contact center servers 20 including a specific contact center server, to which the client 30 is initially connected, are configured to store and manage information about service providers cooperating in the link service and link information for linking the contact center servers 20 and chatbot servers 10 operated by the service providers. In other words, the contact center servers 20 are configured to store and manage the information (e.g., the name, etc.) about the service providers cooperating in the link service, the link information (e.g., the phone number information of each contact center, etc.) for linking the contact center servers 20 operated by the service providers, and the link information (e.g., the URL information of each chatbot server, the phone number information of the integrated operation server 50, etc.) for linking the chatbot servers 10, which are matched to each other.

The information about the service providers and the link information for linking the contact center servers 20 and the chatbot servers 10, which are stored in and managed by the contact center servers 20, may be stored and managed by various methods. For example, such information may be stored and managed as being received from the integrated operation server 50, or as being updated periodically or when it is renewed (e.g., when there is a change in the service providers cooperating in the link service, etc.).

As described above, the client 30 may make a request for connecting with a desired different contact center server 20 or a desired specific chatbot server 10 while maintaining the state of being initially connected to one specific contact center server (e.g., the first contact center server) among the plurality of contact center servers 20, and receive the query processing service from at least one of different contact center servers 20 (e.g., the second to nth contact center servers) or a specific chatbot server 10 by the call forwarding of the specific contact center server 20. In other words, the client 30 may receive the link service by directly connecting with a desired different contact center server 20 or indirectly connecting with a desired chatbot server 10 through the relaying of the integrated operation server 50 without chanting the current connection state.

Here, the client 30 may correspond to one of various terminals or media as long as it can transmit a query and receive a response by accessing the contact center server 20.

For example, the client 30 may include a computer, a mobile phone, a smartphone, or the like connectable to a network.

While being connected to the specific contact center server 20, e.g., the first contact center server, the client 30 may need to receive the link service by accessing a different contact center server 20, e.g., the second contact center server. For example, the client 30 may situationally need to receive the query processing service from the contact center server 20 operated by KB bank while receiving the query processing service by initially accessing the contact center server 20 operated by Nonghyup Bank through an accessing means.

In this case, the client 30 may receive the link service by accessing the different contact center server 20 while maintaining the current connection state without terminating the current connection state.

While being connected to the contact center server 20, e.g., the first contact center server, the client 30 may need to receive the link service by accessing one chatbot server 10, e.g., the first chatbot server among the plurality of chatbot servers 10. For example, the client 30 may situationally need to receive the query processing service from the chatbot server 10 operated by Hyundai card Co., Ltd. while receiving the query processing service by initially accessing the contact center server 20 operated by Nonghyup Bank through the accessing means.

In this case, the client 30 may receive the link service by indirectly accessing a specific chatbot server 10 (e.g., the chatbot server operated by Hyundai Card Co., Ltd.) through the relaying of the integrated operation server 50 while maintaining the current connection state without terminating the current accessing means.

When receiving the link intention mark and the information about one of the service providers operating the contact center servers 20 from the client 30, the specific contact center server 20 performs the call forwarding while transmitting the session initiation protocol (SIP) information of the client 30 to the contact center server 20 operated by the service provider corresponding to the received information so that the client 30 can receive the query processing service from the contact center server 20 operated by the service provider corresponding to the received information. Further, when receiving the link intention mark and the information about one of the service providers operating the chatbot servers 10 from the client 30, the specific contact center server 20 performs the call forwarding while transmitting the SIP information of the client 30 to the integrated operation server 50 so that the client 30 can receive the query processing service from the chatbot server 10 operated by the service provider corresponding to the received information through the relaying of the integrated operation server 50.

Specifically, when the client 30 transmits the link intention mark and the information about the service provider, to which the link query will be made, to the currently connected specific contact center server 20, the specific contact center server 20 recognizes that the client 30 intends to receive the link service, based on the link intention mark.

The specific contact center server 20 identifies whether the service provider, to which the link query will be made, operates the contact center server 20 or the chatbot server 10, based on the stored and managed information about the service providers and the stored and managed link information for linking the contact center servers and the chatbot servers operated by these service providers.

When it is identified that the service provider, to which the link query will be made, operates the contact center server 20, the call forwarding is performed while various pieces of information, such as a country, a telecommunication company, a phone number, etc. included in the SIP information of the client 30 are transmitted to the contact center server 20. Then, the contact center server 20 is automatically connected to the client 30, and generates a response to the link query received from the client 30, thereby providing the query processing service.

On the other hand, when it is identified that the service provider, to which the link query will be made, operates the chatbot server 10, the call forwarding is performed while various pieces of information, such as a country, a telecommunication company, a phone number, etc. included in the SIP information of the client 30 are transmitted to the integrated operation server 50 because the client 30 and the chatbot server 10 are not directly connectable by the call forwarding. Then, the contact center server 20 is automatically connected to the integrated operation server 50, and generates a response to the link query received from the client 30 through the relaying of the integrated operation server 50, thereby providing the query processing service.

In more detail, when the client 30 transmits a link intention mark (e.g., a phone key button "##") and information about a service provider for a link query to a currently connected specific contact center server 20, the specific contact center server 20 recognizes that a user intends to make the link query to a different contact center server 20 or a chatbot server 10, based on "##" corresponding to the link intention mark.

Then, when it is identified that the service provider corresponding to the received information operates the contact center server 20, the specific contact center server 20 performs the call forwarding while transmitting various pieces of information included in the SIP information and needed for contact with a user to the contact center server 20 operated by the corresponding service provider. On the other hand, when it is identified that the service provider corresponding to the received information operates the chatbot server 10, the specific contact center server 20 performs the call forwarding while transmitting various pieces of information included in the SIP information and needed for contact with a user to the integrated operation server 50 capable of processing the relaying between the chatbot server 10 and the contact center server 20 operated by the corresponding service provider When the client 30 for making a link query to a contact center server 20 and the corresponding contact center server 20 are connected by the call forwarding of the specific contact center server, the client 30 can directly make the link query to the contact center server 20, and the contact center server 20 can generate a response to the link query and transmit the response to the client 30, thereby performing the query processing service.

Further, when the client 30 for making a link query to a chatbot server 10 and the integrated operation server 50 are connected by the call forwarding of the specific contact center server, the client 30 can be indirectly connected to the chatbot server for the link query through the relaying of the integrated operation server 50 and make the link query, and the contact center server 20 can generate a response to the link query and indirectly transmit the response to the client 30 through the relaying of the integrated operation server 50, thereby performing the query processing service.

When the integrated operation server 50 is connected to the client 30 by the call forwarding of the specific contact center server 20 to which the client 30 is initially connected, the integrated operation server 50 accesses the chatbot server 10 to which the client 30 will make the link query. Then, the integrated operation server 50 receives the link query from the client 30, and relays the query processing service between the client 30 and the chatbot server 10.

The integrated operation server 50 that performs the relaying accesses the chatbot server 10, receives a link query from the client 30, converts the link query into a text, transmits the text to the chatbot server 10, receives a response from the chatbot server 10, converts the response into a voice, and transmits the voice to the client 30.

The integrated operation server 50 receives the link information (e.g., the URL information) of the chatbot server 10, to which the client will make the link query, from the specific contact center server 20 to which the client is initially connected. Therefore, the integrated operation server 50 can access the chatbot server 10 to which the client 30 will make the link query. Thus, the integrated operation server 50 accesses the chatbot server 10 and then transmits the link query from the client 30 to the chatbot server 10.

Here, the link query received from the client 30 is given as voice information, and the information to be transmittable to the chatbot server 10 is given as text information. Therefore, the integrated operation server 50 employs the relaying processor 55 to convert the link query received from the client 30 in the form of a voice into a text and then transmit the text to the chatbot server 10.

The chatbot server 10 generates a response to the received text converted from the link query, and transmits the response to the integrated operation server 50. In this case, the response received in the integrated operation server 50 is given as text information, and the response to be transmittable to the client 30 is given as voice information. Therefore, the integrated operation server 50 employs the relaying processor 55 to convert the response received from the contact center server 20 in the form of a text into a voice, and then transmit the voice to the client 30.

The contact center server 20 that has performed the call forwarding terminates the connection with the client 30 after performing the call forwarding, or terminates the connection with the client 30 after the client 30 is connected to the contact center server 20 operated by the service provider corresponding to the received information or the integrated operation server 50 that performs the relaying.

In other words, the contact center server 20 that has requested the call forwarding terminates the connection with the client 30 after the client 30 is automatically connected to the different contact center server 20 or the integrated operation server 50 or after requesting the call forwarding. Therefore, the link query and the response between the client 30 and the different contact center server 20 or the integrated operation server 50 is not exposed to the contact center server 20 that has requested the call forwarding.

The contact center server 20 or the chatbot server 10, to which the client 30 will make a link query, performs an authentication process for the client 30 before performing the query processing service for the link query. The corresponding contact center server 20 or the chatbot server 10 may directly perform the authentication process, or the integrated operation server 50 may perform this authentication process on behalf of the different chatbot server 10 or the contact center server 20.

When the client 30 needs to make a link query to the contact center server 20, the contact center server 20 may perform an operation of requesting the integrated operation server 50 to identify whether the authentication of a user is valid, before or after being directly connected to the client 30 through the call forwarding.

Further, when the client 30 needs to make a link query to the chatbot server 10 through the relaying of the integrated operation server 50, the chatbot server 10 may perform an operation of requesting the integrated operation server 50 to identify whether the authentication of a user is valid, before or after the client 30 and the integrated operation server 50 are connected to the client 30 through the call forwarding.

As described above, when the client 30 requests connection with the specific chatbot server 10 while being connected to the specific contact center server 20, the integrated operation server 50 performs an operation of relaying the query processing service between the client 30 and the specific chatbot server 10.

Further, the integrated operation server 50 performs operations of storing and managing the information about the plurality of service providers and the information about the plurality of contact center servers 20 and chatbot servers 10 operated by these service providers, receiving the link query from the client, and performing the authentication process for a user of the client 30 on behalf of the contact center server 20 or chatbot server 10 as requested by the contact center server 20 or chatbot server 10 that will provide the query processing service.

Such authentication process is the same as the foregoing "proxy authentication process," and thus repetitive descriptions thereof will be avoided.

Below, detailed configurations and operations of the chatbot server 10, the contact center server 20, the client 30, and the integrated operation server 50 in the system 100 for linking the chatbot services and the contact center services will be further described according to an embodiment of the disclosure.

The integrated operation server 50 includes an integrated service information manager 51, an integrated authentication manager 53, and a relaying processor 55.

The integrated service information manager 51 is configured to manage the basic information of the service providers to cooperate in the link service and the link information of the chatbot servers 10 and contact center servers 20 operated by these service providers to be stored as matched to each other. Therefore, the service providers to cooperate in the link service are configured to register and store their own basic information and the link information about the chatbot servers 10 and contact center servers 20 operated by themselves to the integrated service information manager 51 of the integrated operation server 50 in advance.

Further, when the service provider registered to cooperate in the link service does not want to share the link service with other service providers, the integrated service information manager 51 stores and manages the information about the service providers, with which the link service is desired not to be shared, as being matched to the service providers registered to cooperate in the link service. Therefore, the service providers which want to cooperate in the link service make other service providers, with which the link service is desired not to be shared, be selectively stored and managed in the integrated service information manager 51 of the integrated operation server 50 in advance. Consequently, it is possible to reflect the intention of the specific service providers which do not want to share the link service with other service providers for various reasons such as competition or the like.

The integrated service information manager 51 may transmit pieces of the stored and managed information, i.e., information (e.g., a company name, etc.) about the service provider registered to cooperate in the link service, and the link information of the chatbot servers 10 and contact center servers 20 being operated by the service provider to each chatbot server 10 and each contact center server 20. However, when a service provider, with which a specific service provider does not want to share the link service, is selected, the integrated service information manager 51 does not transmit the information about the specific service provider and the link information about the chatbot servers or contact center servers operated by the specific service provider to the chatbot servers 10 or contact center servers 20 operated by the selected service provider.

After that, when there is a change in the service providers registered to cooperate in the link service due to new registration or withdrawal, or when there is a change in the link information about the specific chatbot server or contact center server, or when there is a change in selection of sharing with the link service (when a service provider with which the link service is desired not to be shared is added or deleted), the integrated service information manager 51 may transmit the changed information to each chatbot server 10 and each contact center server 20.

The integrated authentication manager 53 may be configured to store and manage various authentication means (Kakao Pay, PASS, Shinhan authentication, KB authentication, public authentication, integrated authentication, etc.), and store and manage the service providers registered to cooperate in the link service and at least one authentication means selected by these service provides as being matched to each other when the service provider registered to cooperate in the link service selects at least one among various authentication means. Therefore, when requested to perform an authentication process on behalf of the chatbot server 10 or the contact center server 20 by the chatbot server 10 or the contact center server 20, the integrated authentication manager 53 may allow a user of the client 30 to undergo the authentication process through the authentication means stored and managed as being matched to the service provider operating the chatbot server 10 or the contact center server 20.

The integrated authentication manager 53 stores and manages authentication validity of a user, and stores and manages information about the user whose authentication is valid. Therefore, when the chatbot server 10 or the contact center server 20 makes a request for identifying whether authentication of a user is valid, it is identified whether the authentication of the user is valid, with reference to the stored and managed authentication validity of the user and the stored and managed information about the user.

In this way, the integrated authentication manager 53 of the integrated operation server 50 performs user authentication in an integrated way on behalf of the service providers or the chatbot servers 10 or contact center servers 20 operated by these service providers, so that a user can ultimately avoid repetitive authentication processes and the service providers providing the authentication processes can also reduce time, efforts and costs incurred by repeating the authentication processes for the user who has already been validly authenticated just before access.

The relaying processor 55 performs an operation of relaying the query processing service between the client 30 and the chatbot server 10 (or the contact center server 20) to which the client 30 wants to make the link query.

Next, the chatbot server 10 includes a first service controller 11, an authentication processor 13, a first link information manager 15, and a first query processor 17, and the contact center server 20 includes a second service controller 21, a second authentication processor 23, a second link information manager 25, and a second query processor 27.

The first service controller 11 controls the general operations of the chatbot server 10, and the second service controller 21 controls the general operations of the contact center server 20.

When the client 30 tries accessing the chatbot server 10 (or the contact center server 20) through the accessing means (or a linking means), the first authentication processor 13 performs the authentication process for a user of the client 30 under control of the first service controller 11 (or the second service controller 21). In other words, the first authentication processor 13 or the second authentication processor 23 carries out the authentication for the user of the client 30 through at least one of various authentication means such as Kakao Pay, PASS, Shinhan authentication, KB authentication, public authentication, integrated authentication, etc.

The first service controller 11 (or the second service controller 21) allows the access (or the link) of the client 30 when the user is authenticated by the first authentication processor 13 (or the second authentication processor 23), and provides the query processing service of generating a response through the first query processor 17 (or the second query processor 27) and transmitting the response to the client 30 when a query is received from the client 30. The first query processor 17 (or the second query processor 27) may analyze the received query, generate a response based on a database (not shown) of the service provider, and transmit the generated response to the client 30 under control of the first service controller 11 (or the second service controller 21), thereby providing the query processing service.

Meanwhile, when a user is authenticated by the authentication processor 13 and the access of the client is allowed, the first service controller 11 controls the information (a company name, etc.) about the service providers cooperating in the link service, and the link information of the chatbot servers 10 and contact center server 10 operated by these service providers, which are stored and managed in the first link information manager 15, to be transmitted to the client 30.

The first link information manager 15 (or the second link information manager 25) stores and manages the information about the service providers cooperating in the link service, and the link information of the chatbot servers and contact center servers operated by these service providers as being matched to each other, and is connected to the integrated operation server 50 under the control of the first service controller 11 (or the second service controller 21) to store and manage pieces of information received from the integrated service information manager 51, and update the information with changed information received from the integrated service information manager 51 as described above.

The client 30 includes a query transmitter 31. The query transmitter 31 may receive the query processing service by transmitting a query to the specific chatbot server 10 or contact center server 20 connected (or linked) via a specific accessing means (or linking means), and further receive the query processing service by transmitting a link query to a different chatbot server 10 or contact center server 20 while being connected (or linked) to the specific chatbot server 10 or contact center server 20.

By the system for linking chatbot services and contact center services with the foregoing objects and solutions, a client is allowed to receive a query processing service from at least one of other chatbot servers or other contact center servers without changing a preexisting connection state while being initially connected to a specific chatbot server or a specific contact center server, so that a user can easily use a plurality of query processing services by linking the chatbot servers and contact center servers operated by a plurality of service providers, thereby minimizing the time, efforts and costs of the user who wants to receive the plurality of query processing services through the plurality of service providers.

Although a few exemplary embodiments of the disclosure have been shown and described, these are for illustrative purpose only and it will be appreciated by those skilled in the art that changes may be made in these embodiments without departing from the principles and spirit of the invention, the scope of which is defined in the appended claims and their equivalents.

| Reference Numerals | |
| --- | --- |
| 10: | chatbot server |
| 20: | contact center server |
| 30: | client |
| 50 | integrated operation server |
| 100: | system for linking chatbot service and contact center server |

What is claimed is:

1. A system for linking chatbot services and contact center services, the system comprising:
    a plurality of chatbot servers operated by a plurality of service providers, and configured to provide a query processing service that generates a response to a query received from a client and transmits the response to the client;
    a plurality of contact center servers operated by a plurality of service providers, and configured to provide a query processing service that generates a response to a query received from a client and transmits the response to the client;
    a client configured to receive a query processing service from at least one different chatbot server or at least one contact center server while being initially connected to one specific chatbot server among the plurality of chatbot servers, or receive a query processing service from a different contract center server or a specific chatbot server by call forwarding of the specific contact center server when a request for accessing the different contact center server or the specific chatbot server is made while being initially connected to one specific contact center server among the plurality of contact center servers; and
    an the integrated operation server configured to process a query processing service to be relayed between the client and at least one contact center server when the client wants to receive the query processing service from the at least one contact center server while being initially connected to one specific chatbot server among the plurality of chatbot servers, and process a query processing service to be relayed between the client and the specific chatbot server when the client requests an access to the specific chatbot server while being connected to the specific contact center server.

2. The system of claim 1, wherein the specific chatbot server to which the client is initially connected is configured to transmit information about the service providers cooperating in a link service and link information for linking the chatbot servers and contact center servers operated by the service providers to the client.

3. The system of claim 2, wherein:
when a user makes inputs on a link intention mark and one of the service providers operating the chatbot server and then makes an input for a link query, the client transmits the link query to the chatbot server operated by the service provider corresponding to the input and receives the query processing service, and
when the user makes inputs on the link intention mark and one of the service providers operating the contact center server and then makes an input for a link query, the client transmits the link query to the integrated operation server and receives the query processing service from the contact center server operated by the service provider corresponding to the input through relaying of the integrated operation server.

4. The system of claim 3, wherein the integrated operation server that has received a link query is configured to make a phone call to the contact center server, convert the link query into a voice, transmit the voice the contact center server, receive a response from the contact center server, convert the response into a text, and transmit the text to the client.

5. The system of claim 1, wherein the specific contact center server to which the client is initially connected is configured to store and manage information about the service providers cooperating in a link service and link information for linking the contact center servers and chatbot servers operated by the service providers.

6. The system of claim 5, wherein:
when receiving a link intention mark and information about one of the service providers operating the contact center server from the client, the specific contact center server performs call forwarding while transmitting session initiation protocol (SIP) information about the client to the contact center server operated by the service provider, the information of which has been received, so that the client can receive the query processing service from the contact center server operated by the corresponding service provider, and
when receiving the link intention mark and information about one of the service providers operating the chatbot server from the client, the specific contact center server performs call forwarding while transmitting SIP information about the client to the integrated operation server, so that the client can receive the query processing service from the chatbot server operated by the server provider, the information of which has been received, through relaying of the integrated operation server.

7. The system of claim 6, wherein the integrated operation server that performs the relaying is configured to access the chatbot server, receive a link query from the client, convert the link query into a text, transmit the text to the chatbot server, receive a response from the chatbot server, convert the response into a voice, and transmit the voice to the client.

* * * * *